(12) United States Patent
Sheaffer et al.

(10) Patent No.: US 9,619,298 B2
(45) Date of Patent: Apr. 11, 2017

(54) SCHEDULING COMPUTING TASKS FOR MULTI-PROCESSOR SYSTEMS BASED ON RESOURCE REQUIREMENTS

(71) Applicant: Empire Technology Development LLC, Wilmington, DE (US)

(72) Inventors: Gad S Sheaffer, Haifa (IL); Shmuel Ur, Galil (IL)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 405 days.

(21) Appl. No.: 14/130,128

(22) PCT Filed: Apr. 17, 2013

(86) PCT No.: PCT/US2013/036982
§ 371 (c)(1),
(2) Date: Dec. 30, 2013

(87) PCT Pub. No.: WO2014/171935
PCT Pub. Date: Oct. 23, 2014

(65) Prior Publication Data
US 2015/0150019 A1 May 28, 2015

(51) Int. Cl.
G06F 9/46 (2006.01)
G06F 7/38 (2006.01)
G06F 9/44 (2006.01)
G06F 9/50 (2006.01)

(52) U.S. Cl.
CPC .......... G06F 9/5088 (2013.01); G06F 9/5044 (2013.01)

(58) Field of Classification Search
None
See application file for complete search history.

(56) References Cited

U.S. PATENT DOCUMENTS

| 8,997,071 B2* | 3/2015 | Chen ...................... G06F 8/451 717/107 |
| 9,021,490 B2* | 4/2015 | Marchand ............. G06F 9/4881 718/104 |
| 2011/0066828 A1 | 3/2011 | Wolfe et al. |
| 2011/0088041 A1 | 4/2011 | Alameldeen et al. |
| 2011/0161974 A1 | 6/2011 | Kurabayashi et al. |

FOREIGN PATENT DOCUMENTS

| WO | 2007128168 A1 | 11/2007 |
| WO | 2010067377 A2 | 6/2010 |

OTHER PUBLICATIONS

Brorsson, M., "Manycore programming models, a case for task centric programming," KTH & SICS, Kista Multicore Center, Nov. 24, 2010, pp. 1-19.

(Continued)

*Primary Examiner* — Bing Zhao
(74) *Attorney, Agent, or Firm* — Brundidge & Stanger, P.C.

(57) ABSTRACT

In an example embodiment, one or more series of executable components may be configured to execute a respective processes, and one or more corresponding scheduling components may be configured to direct migration of each of the corresponding one or more series of executable components to a processing element thereof.

23 Claims, 8 Drawing Sheets

(56) References Cited

OTHER PUBLICATIONS

Shelepov, D. and Fedorova, A., "Scheduling on Heterogeneous Multicore Processors Using Architectural Signatures," Workshop on the Interaction between Operating Systems and Computer Architecture, in conjunction with ISCA, 2008, pp. 1-9.

Peter, S. et al., "Design Principles for End-to-End Multicore Schedulers," Proceedings of the 2nd USENIX conference on Hot topics in parallelism, HotPar'10, 2010, pp. 1-6.

Chen, J. and John, L.K., "Efficient Program Scheduling for Heterogeneous Multi-core Processors," Design Automation Conference, Jul. 26-31, 2009, pp. 927-930.

Kumar, R. et al., "Single-ISA Heterogeneous Multi-Core Architectures for Multithreaded Workload Performance," In Proceedings of the 31st International Symposium on Computer Architecture, Jun. 2004, pp. 64-75.

International Search Report and Written Opinion for International Patent Application No. PCT/US2013/036982 mailed Jul. 18, 2013.

\* cited by examiner

SCHEDULING COMPUTING TASKS FOR MULTI-PROCESSOR SYSTEMS BASED ON RESOURCE REQUIREMENTS

TECHNICAL FIELD

The embodiments described herein pertain generally scheduling hardware utilization in a multi-processor system.

CROSS-REFERENCE TO RELATED APPLICATION

This Application is the U.S. National Stage filing under 35 U.S.C. §371 of PCT Application Ser. No. PCT/US13/36982 filed on Apr. 17, 2013. The disclosure of the PCT Application is hereby incorporated herein by reference in its entirety.

BACKGROUND

Unless otherwise indicated herein, the approaches described in this section are not prior art to the claims in this application and are not admitted to be prior art by inclusion in this section.

In a multi-processor system, the operating system, or any kernels external to an application, may schedule execution of one or more applications across a number of processors. Current solutions intended to improve hardware utilization include scheduling threads according to processor availability, typically to a predetermined type of available processor.

SUMMARY

Technologies are generally described for scheduling computing tasks for multi-processor systems, for example, heterogeneous systems. The various techniques may be implemented in various devices, methods and/or systems.

In some examples, various techniques may be implemented as a computer-readable medium. Some example computer-readable mediums storing a data structure may include executable code including one or more executable components that are configured to execute a respective process, and one or more scheduling components, at least some of which respectively corresponds to at least one of the executable components and configured to direct migration of the corresponding one of the executable components to a particular processing element.

In some examples, various techniques may be implemented as methods. Some methods may include registering a processor-enabled application program, compiling a scheduling component maintained by the application program, and migrating a thread to a processing element as directed by the compiled scheduling component.

In some additional examples, various techniques may be implemented as apparatuses. Some apparatuses may include a first component, including a first hardware element, to analyze executable instructions to generate at least a description of a particular processing element, a second component including a second hardware element, coupled to the first component, to integrate metadata maintained by at least one thread of the executable instructions, and a third component including a third hardware element, coupled to the second component, to migrate execution of the at least one thread to a processing element as directed by the integrated metadata.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications may be made in view of the following detailed description. The use of the same reference numbers in different figures indicates similar or identical items. In the drawings.

DETAILED DESCRIPTION

Figure 1:
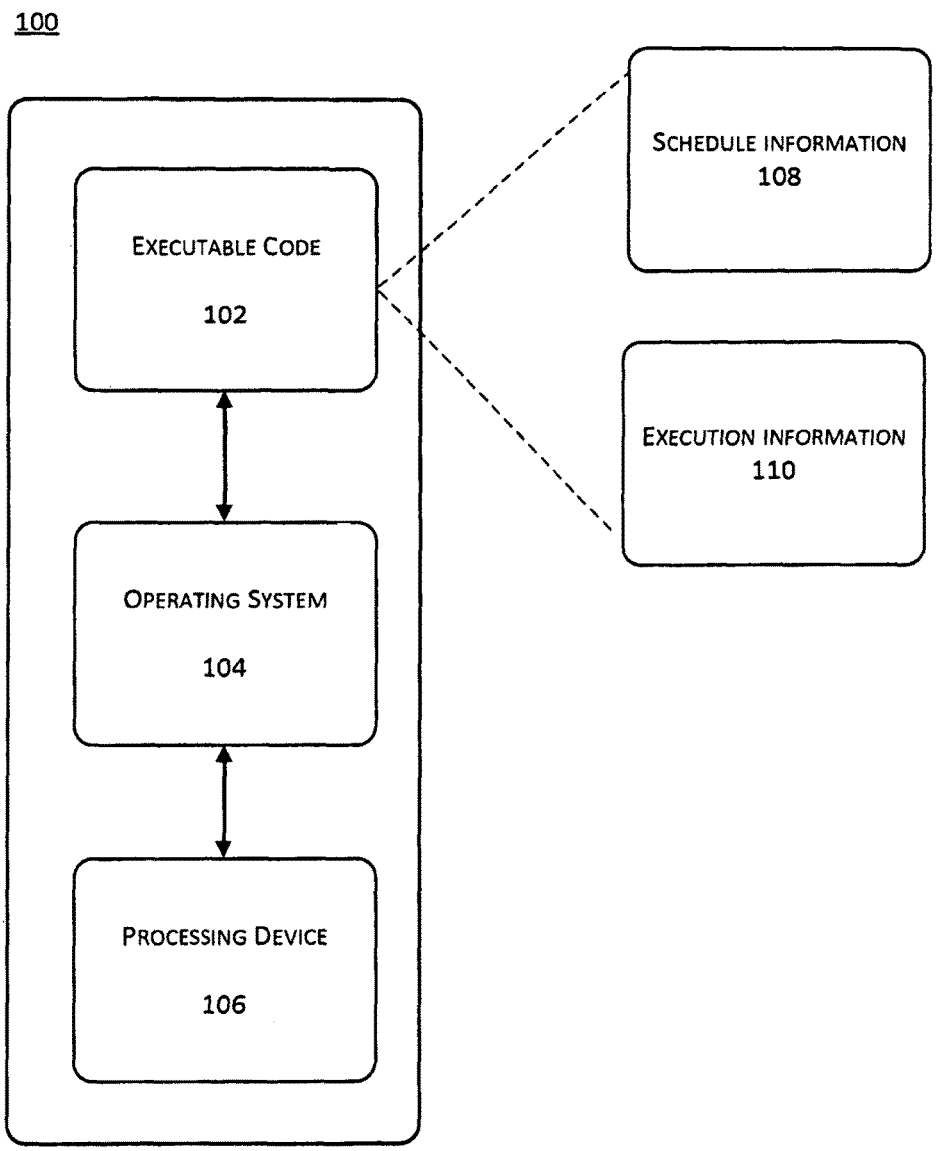
FIG. 1 shows an example computing environment in which one or more embodiments of scheduling for multi-processor systems may be implemented.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. The aspects of the present disclosure, as generally described herein and illustrated in the drawings, may be arranged, substituted, combined, separated, and designed in a wide variety of different configurations, all of which are explicitly contemplated herein.

FIG. 1 shows an example computing environment 100 in which one or more embodiments of scheduling for multi-processor systems may be implemented, in accordance with at least some embodiments described herein. Computing environment 100 may be implemented, for example, in one or more computing devices communicatively coupled to each other via a network. As depicted, computing environment 100 may include executable code 102, an operating system 104, and a processing device 106, which are operatively/communicatively coupled to each other. In at least some examples, executable code 102 may include schedule information 108 and execution information 110. Schedule information 108 may communicate minimal or adequate requirements, an optimal or adequate execution environment, and/or other performance parameters to operating system 104. Operating system 104 may utilize such received information to schedule tasks related to execution of at least portions of executable code 102 on processing device 106 or resources corresponding thereto. However, this configuration is an example only, and other configurations are possible.

Executable code 102 may be designed, programmed, and/or configured to provide, to operating system 104, information regarding allocation of resources corresponding to processing device 106 to implement efficient execution performance and hardware utilization. Executable code 102 may be further designed, programmed, and/or configured as computer program products, applications, or other forms of software code including vector codes, or other forms of computer-readable instructions that are executable by one or more processors. Thus, in accordance with examples of scheduling for multi-processor systems, scheduling components of executable code 102 may provide operating system 104 with information to enhance execution performance and hardware utilization for processing device 106; and executable components of executable code 102 may include executable instructions for at least portions of processing device 106 to, e.g., write data to storage systems, to render three-dimension models, to perform scientific calculations, or to perform other operations each of which may have different hardware utilization parameters, such as minimum hardware requirements.

Operating system 104 may be designed, programmed, and/or configured to assign certain computing resources of processing device 106 to execution of at least portions of executable code 102, based on the aforementioned information received from executable code 102. In some examples, operating system 104 may be designed, programmed, and/or configured to schedule execution of at least portions of executable code 102 on processing device 106, in accordance with availability of corresponding resources, and a "first-in-first-out" queue, based on the aforementioned information received from executable code 102. Further to the examples, execution of a portion or portions of executable code 102 may be delayed while processing device 106 executes other portions of executable code 102 or is otherwise occupied by operating system 104. Thus, in accordance with the information received from executable code 102 prior to execution thereof, on-hold portions of executable code 102 may be added to a "first-in-first-out" (FIFO) queue, with a portion of executable code 102 that is first added to the FIFO queue being assigned to processing device 106 for execution when processing device 106 is available. In other examples, when processing device 106 is configured as a multi-core system including more than one cores of different types, the information received from executable code 102 prior to execution thereof may instruct operating system 104 to schedule execution of certain portions of executable code 102 to a particular type of core. For example, rendering three-dimension models may only be assigned to Graphics Processing Units (GPU).

Operating system 104 may refer to any proprietary or open-source operating system including, but not limited to, Microsoft® Windows®, UNIX®, Berkeley Software Distribution (BSD) and its descendants, Apple® OS X®, Linux® and GNU, and Google® Chrome® OS. Other operating system(s) may be used for operating system 104. Operating system 104 may or may not be hosted on processing device 106 or one or more elements thereof.

Processing device 106 may refer to, as examples, any one of Graphics Processing Units (GPU), Central Processing Units (CPU), or other types of processing units and cores thereof. After being assigned to process certain portions of executable code 102 by operating system 104, based on the information received from executable code 102 prior to execution thereof, processing device 106 may carry out the instructions embedded in executable code 102 and perform arithmetical, logical, input/output, or other operations of computing environment 100. In accordance with some examples, processing device 106 may include one or more processing elements so that operating system 104 may be configured to migrate, or schedule, the execution of certain portions of executable code 102 to different ones of the one or more processing elements.

Thus, FIG. 1 shows an example environment for implementation of the scheduling mechanism or method in accordance with various embodiments.

Figure 2:
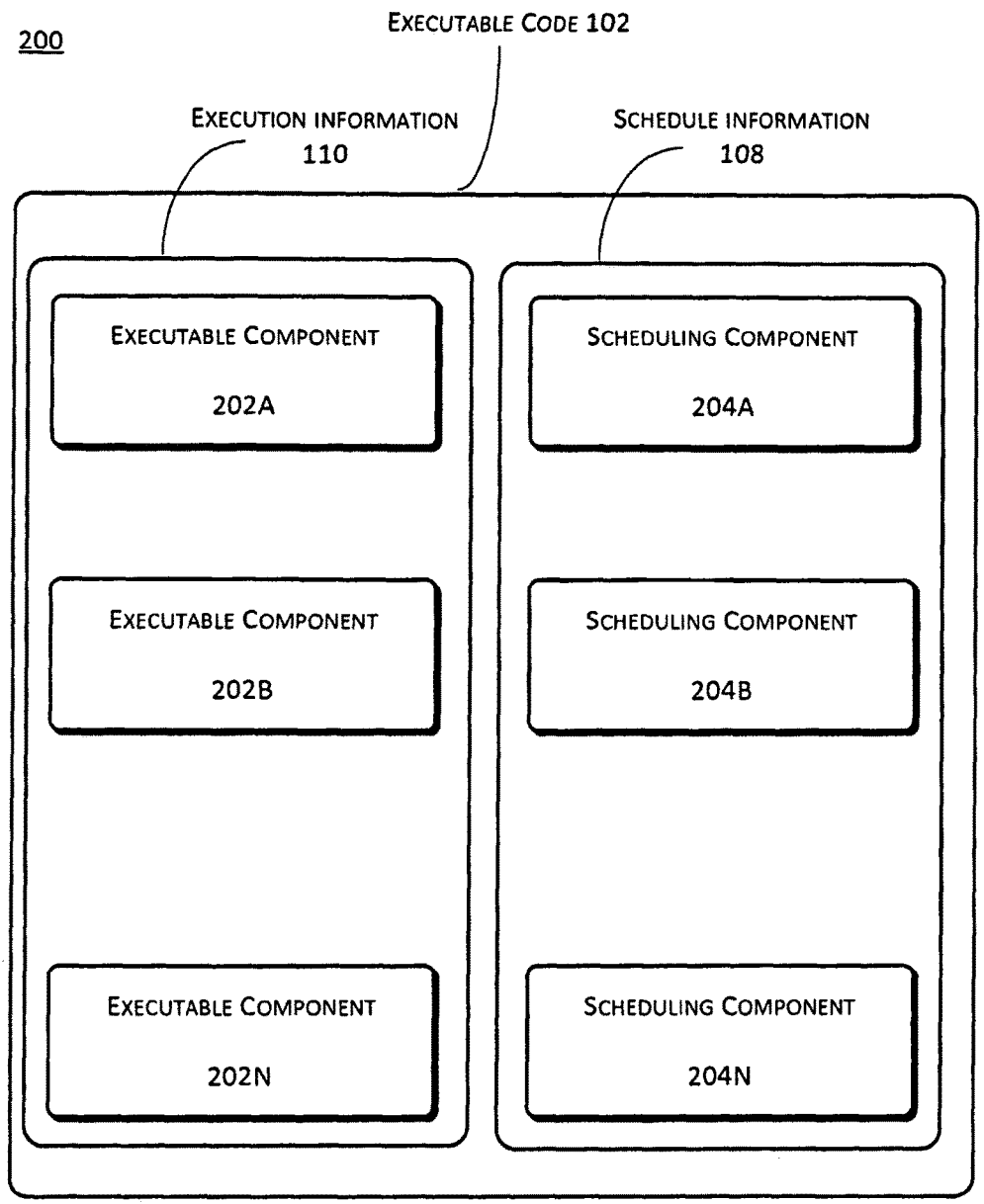
FIG. 2 shows an example configuration of executable code by which at least portions of scheduling for multi-processor systems may be implemented.

FIG. 2 shows an example configuration 200 of executable code 102 by which at least portions of scheduling for multi-processor systems may be implemented, arranged in accordance with at least some embodiments described herein. Example configuration 200 includes or may be embodied as a non-transitory computer readable medium having a data structure stored thereon that includes executable code 102 and scheduling components 204. As depicted, example configuration 200 of executable code 102 includes schedule information 108 and execution information 110. Execution information 110 may include executable components 202A-202N and schedule information 108 may include scheduling components 204A-204N. Scheduling components 204A-204N may provide information regarding, for example, minimal requirements and/or an optimal execution environment of one or more of executable components 202A-202N. Each of scheduling components 204A-204N may respectively correspond to at least one of the executable components 202A-202N. However, the configuration is an example only and other configurations are possible. While executable code 102 may be implemented as software programs, applications, or processes, other examples of executable components 202A-202N may include one or more smaller sequences or blocks of executable code 102, e.g., processes of applications or threads of processes. Such examples are not intended to be exhaustive, and therefore should not be interpreted to be so. Unless a distinction of one or more of executable components 202A-202N is needed to enhance the description for scheduling for multi-processor systems, general references may be made herein to "executable components 202." Similarly, scheduling components 204A-204N may be referred as "scheduling components 204" if no distinction is needed.

Executable components 202, in accordance with some examples, may be configured to execute respective processes, which may be smaller sequences or blocks of executable code 102 including one or more threads of a respective process.

Scheduling components 204, each of which may respectively correspond to at least one of the executable components 202, may direct migration of each of corresponding executable components 202 to a preferred or adequate processing element by describing minimal or adequate processing requirements or parameters and/or a preferred or adequate execution environment for executing one or more corresponding executable components 202. Scheduling components 204 may describe an optimal or adequate processing element, which may identify the preferred or adequate execution environment for a corresponding one of executable components 202. The preferred or adequate processing element may be one of a series of processing elements including any type of processing units, such as GPUs, CPUs, and cores.

As set forth above, executable code 102 may be designed, programmed, and/or configured to provide, to operating system 104, scheduling information regarding allocation of computing resources corresponding to processing device 106 to implement preferred or adequate execution performance and hardware utilization. To establish communication with operating system 104, in accordance with at least in some example embodiments, executable code 102 may use a system call to register scheduling components 204 with operating system 104, a run-time environment, a device driver, a hyper-visor and/or other element for the location and organization of scheduling components 204. In some example embodiments, the characteristics of executable components 202 may change and cause scheduling components 204 to change the description of the minimal or adequate requirements and/or optimal or adequate execution environment, thus executable code 102 may initiate a new system call to notify operating system 104, the run-time environment, the device driver, the hyper-visor, and/or other element.

Thus, FIG. 2 shows an example configuration 200 of executable code 102 by which at least portions of scheduling for multi-processor systems may be implemented in accordance with various embodiments.

Figure 3:
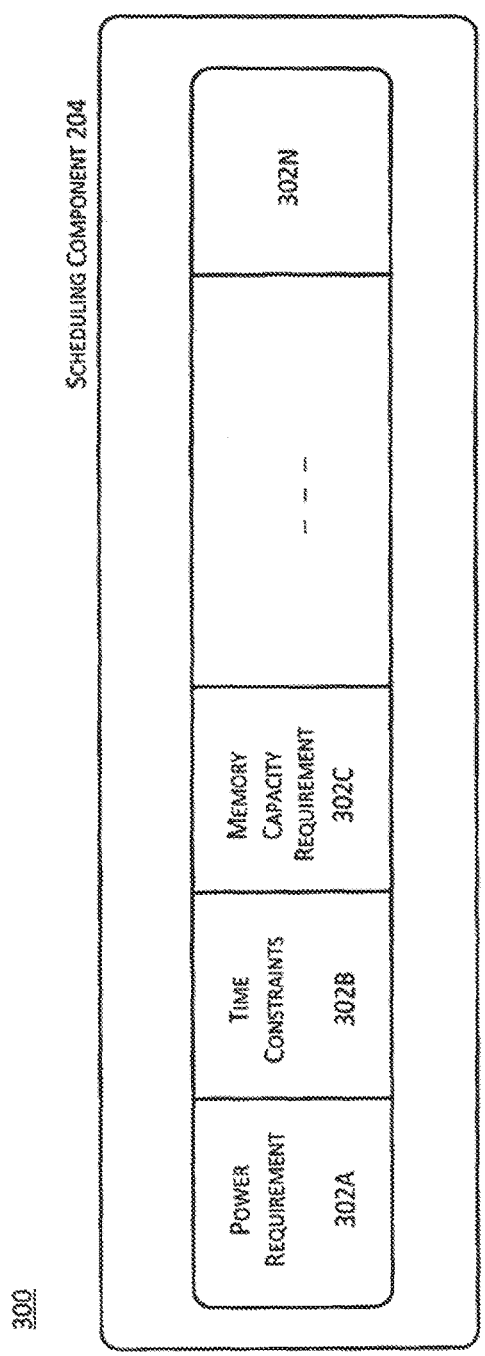
FIG. 3 shows an example configuration of a scheduling component by which at least portions of scheduling for multi-processor systems may be implemented.

FIG. 3 shows an example configuration 300 of one of scheduling components 204 by which at least portions of scheduling for multi-processor systems may be implemented, arranged in accordance with at least some embodiments described herein. As depicted, example configuration 300 of one of scheduling components 204 includes at least one power requirement 302A, at least one time constraint 302B, at least one memory capacity requirement 302C, and/or other types of information 302N (including alternative or additional values for 302A-302C etc. in some embodiments).

Scheduling components 204 store information regarding minimal or adequate requirements, including minimal amounts of identified types of computing resources and/or a preferred execution environment, regarding execution of corresponding ones of executable components 202. The minimal requirements and/or preferred execution environment may further include power requirements 302A, time constraints 302B, memory capacity requirements 302C, and/or other types of information 302N usable to provide at least adequate execution performance; however, this configuration is an example only, and other configurations are possible. Scheduling components 204 may further provide information to describe current and/or upcoming program phases in terms that are generic so as to allow flexibility for operating system 104 to schedule certain computing resources of processing device 106. For example, a length of a next phase or phases of executable code 102 may be included in the information from a respective one of scheduling components 204 so that operating system 104 may schedule the computing resources before the next phase or phases begin.

In one example embodiment of scheduling components 204, a compiler may generate executable code 102 for a specific loop and provide information in scheduling components 204 as to the number of elements in a specific vector, whether specific vector architecture support is required or usable, a data footprint in a first level cache for which a corresponding portion of executable code 102 is optimized, and/or other information. Additionally, a dependency between different computing resources of processing device 106 may be provided in one or more of scheduling components 204. For example, when a large matrix is operated on in sub-matrices, at least one of which may be processed by one of the computing resources, the dependency between the computing resources may be provided in scheduling components 204. In another example embodiment of scheduling components 204, a compiler may provide multiple code paths for specific portions of executable code 102 and may further indicate an appropriate code path for each part of processing device 106 for which one or more portions of executable code 102 may be scheduled.

Information stored in respective ones of scheduling components 204 may be provided in a plurality of mechanisms and combinations thereof. Further, in accordance with some example embodiments for providing the information, such information may be agnostic to any programming language by which executable code 102 and/or scheduling components 204 are designed, programmed, and/or configured. For example, a programmer may describe the information in a natural language, e.g., English. Alternatively, a programmer may partly or fully provide the information by pragmas and/or declarations, via keywords in a programming language. In yet another example, the information may be provided in a format that is capable of being analyzed by a compiler with or without profiling. Further still, the information may be collected from sampling of run-time code.

In accordance with some example embodiments for providing the information in scheduling components 204, a programmer may not be required to input or determine such minimal or adequate requirements and/or preferred or adequate execution environment. Instead, such information may be proactively assigned to executable code 102 from a real time computing environment. For example, during execution of certain portions of executable components 202, e.g., rendering a three-dimension model, executable code 102 may collect statistical performance data and generate a minimal requirement for execution thereof, such for example a GPU with 1 GB (Gigabytes) memory being preferred or suggested, or even optimal, for execution of such portions of executable components 202. Such minimal requirement or other information may then be stored in one or more of scheduling components 204 as memory capacity requirement 302C. Further, information contained in scheduling components 204 may be modifiable during execution of executable code 102, such as when the characteristics of executable code 102 change during different phases, as described previously.

Computing resources, e.g., a core, to which one or more portions of executable code 102 are scheduled, may fail. Thus, in one or more example embodiments, information in one or more of scheduling components 204 may include a pointer to a source code of specific portions of executable code 102 so that a compiler may generate a version of executable code 102, which may not have been deemed necessary when the code was statically compiled, but is currently executable by other available resources of processing device 106. In other example embodiments, executable code 102 may proactively change the information stored in scheduling components 204 and initiate a new system call to notify the operating system 104.

In some embodiments, scheduling components 204 may be maintained semantically close to a Central Processing Unit Identification (CPUID) tree in a homogeneous system including processors or, even in a heterogeneous system, in which processing device 106 includes multiple different processors, however, having essentially the same instruction set architecture. In other embodiments, in which processing device 106 includes processing elements having different structures, such as a vector-oriented main CPU and a thread-oriented GPU, scheduling components 204 may be abstract in specification.

Thus, FIG. 3 describes an example configuration 300 of one of scheduling components 204 by which at least portions of scheduling for multi-processor systems may be implemented in accordance with various embodiments.

Figure 4:
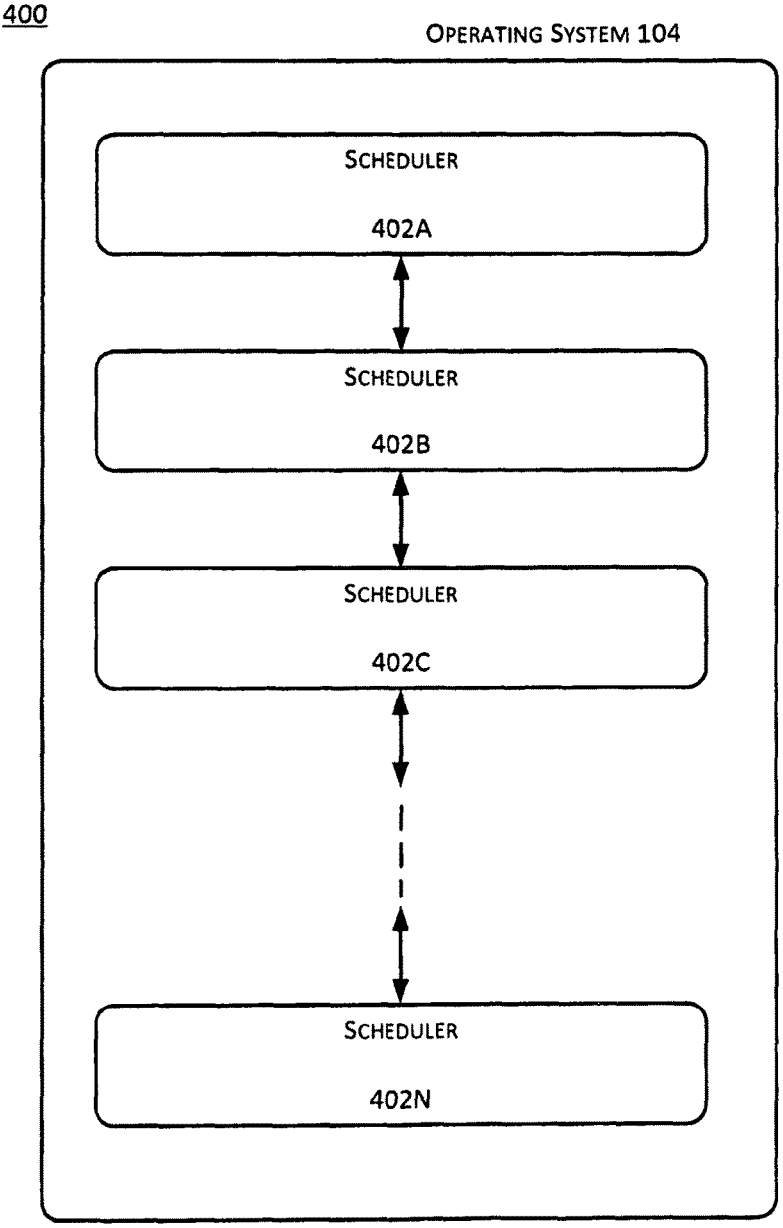
FIG. 4 shows an example configuration of an operating system by which at least portions of scheduling for multi-processor systems may be implemented.

FIG. 4 shows an example configuration 400 of operating system 104 by which at least portions of scheduling for multi-processor systems may be implemented, arranged in accordance with at least some embodiments described herein. As depicted, example configuration 400 includes operating system 104 and schedulers 402A-402N.

Schedulers 402A-402N may refer to components or modules corresponding to operating system 104 that are designed, programmed, and/or configured to schedule computing resources of processing device 106 for one or more portions of executable code 102. In some embodiments, schedulers 402A-402N may form part of operating system 104 itself, while schedulers 402A-402N may be external to operating system 104 in other embodiments. Unless a distinction of schedulers 402A-402N is needed to enhance the description for the scheduling mechanism, general references may be made herein to "schedulers 402." In some examples, operating system 104 may include a global scheduler that governs schedulers 402, which may be configured to perform the same function as referenced herein.

In accordance with some example embodiments, information from one or more scheduling components 204 may be received from operating system 104, and operating system 104 may convey the received information to schedulers 402, one or more of which may correspond to at least one of executable components 202. Schedulers 402 may then schedule computing resources of processing device 106 to the corresponding executable components 202.

In some example embodiments, when executable code 102 proactively changes information in scheduling components 204 during phase shifting, operating system 104 may consult scheduling components 204, and schedulers 402 may accordingly opt to migrate execution of executable components 202 between computing resources of processing device 106 that have different architectures. For example, if an example phase of executable code 102 may use a larger number of executable components, e.g., threads, which are latency tolerant, time constraints 302B in scheduling components 204 may be updated to indicate that GPUs may be a preferred or adequate processing environment for that phase of executable code 102. Schedulers 402 may then migrate execution of executable code 102 from a CPU to a GPU accordingly.

In some alternative or additional examples, executable code 102 may have a data footprint for which, due to its considerable size, latency may be deemed to be significant. Accordingly, time constraints 302B and memory capacity requirements 302C may be updated to indicate that a preferred or adequate processing environment may include a core having caches of a certain capacity. Schedulers 402 may then migrate at least portions of execution of executable code 102 to a core of CPUs having caches of the suitable capacity, if available.

In yet another example, if processing of at least portions of executable code 102 value speed over precision, e.g., executable code 102 includes IEEE 754 compliant floating point calculation, schedulers 403 may schedule all available computing resources of processing device 106 without scheduling any verification process to avoid undue consumption of computing resources.

Thus, FIG. 4 shows an example configuration 400 of operating system 104 by which at least portions of scheduling for multi-processor systems may be implemented in accordance with various embodiments.

Figure 5:
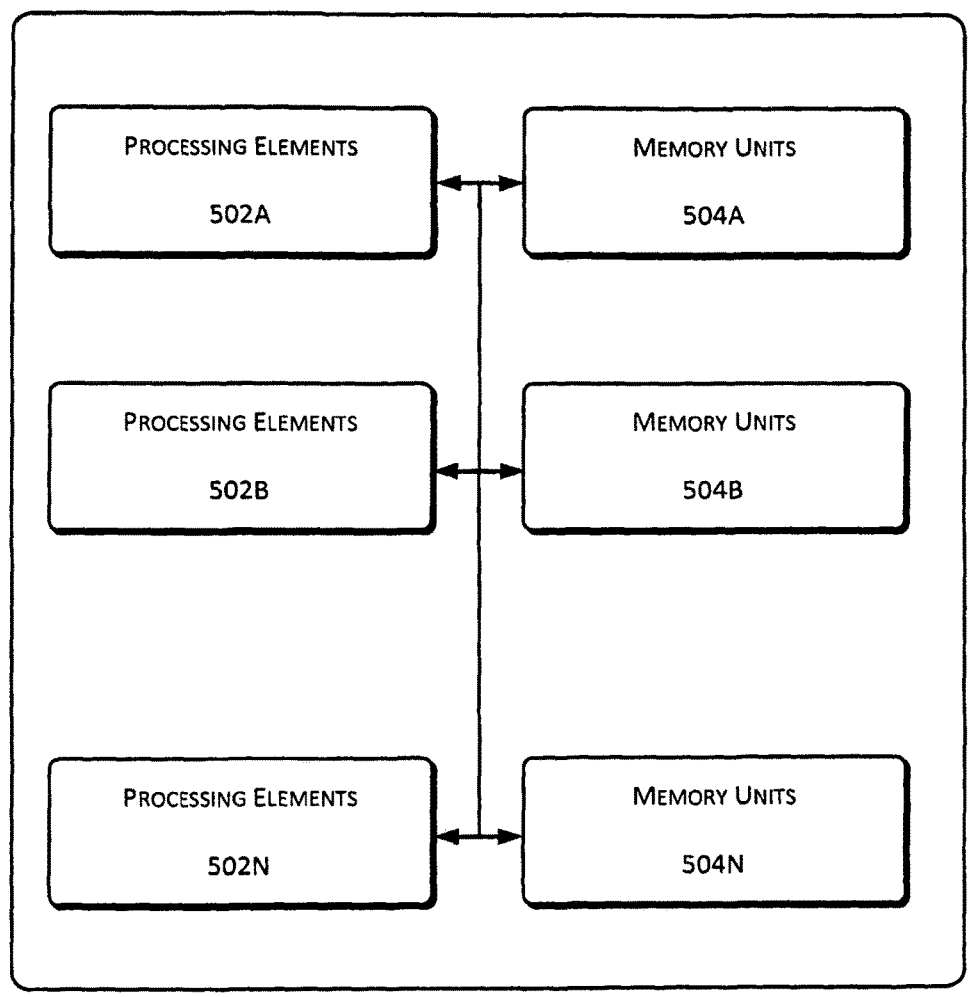
FIG. 5 shows an example configuration of a processing device by which at least portions of scheduling for multi-processor systems may be implemented.

FIG. 5 shows an example configuration 500 of processing device 106 by which at least portions of scheduling for multi-processor systems may be implemented, arranged in accordance with at least some embodiments described herein. As depicted, example configuration 500 includes processing device 106, processing elements 502A-502N, and memory units 504A-504N. Processing elements 502A-502N may be any of CPUs, GPUs, cores, cloud computing resources, other types of resources, and/or any combination thereof. Memory units 504A-504N may be any of Hard Disk Drive (HDD), Solid State Drive (SSD), Random Access Memory (RAM), cache, online storage space, other storage devices and/or any combination thereof. Unless a distinction of processing elements 502A-502N is needed to enhance the description for the scheduling mechanism, general references may be made herein to "processing elements 502." Similarly, memory units 504A-504N may be referred as "memory units 504" if no distinction is needed.

Memory units 504 may be physically or communicatively coupled to processing elements 502, while processing elements 502 may be scheduled to different executable components 202 to store data temporarily or permanently for execution. Such configuration is an example only and other configurations are possible.

In a heterogeneous multi-core system, some of processing elements 502 may differ with regard to architecture and/or capabilities. For example, a respective one of processing elements 502 that is smaller but more energy efficient than others may be scheduled to execute those latency tolerant portions of executable components 202. In at least one other example embodiment, operating system 104 may include information that describes processing elements 502 and capabilities thereof. Such information may include CPU frequency, GPU frequency, cache size, the number of cores, and etc. Executable code 102 may evaluate the information and calculate a preferred or adequate one or more of processing elements 502 for current and future phases. Scheduling components 204 may be updated accordingly.

In some examples, executable code 102 may have a data footprint for which, due to its considerable size, latency may be deemed to be substantial, and so time constraints 302B and memory capacity requirements 302C may be updated to indicate that the optimal or adequate processing units may be a core with caches of a particular capacity that have a different architecture. Schedulers 402 may schedule such a core having the suitable cache capacity among processing elements 502.

Thus, FIG. 5 shows an example configuration 500 of a processing device 106 by which at least portions of scheduling for multi-processor systems may be implemented in accordance with various embodiments.

Figure 6:
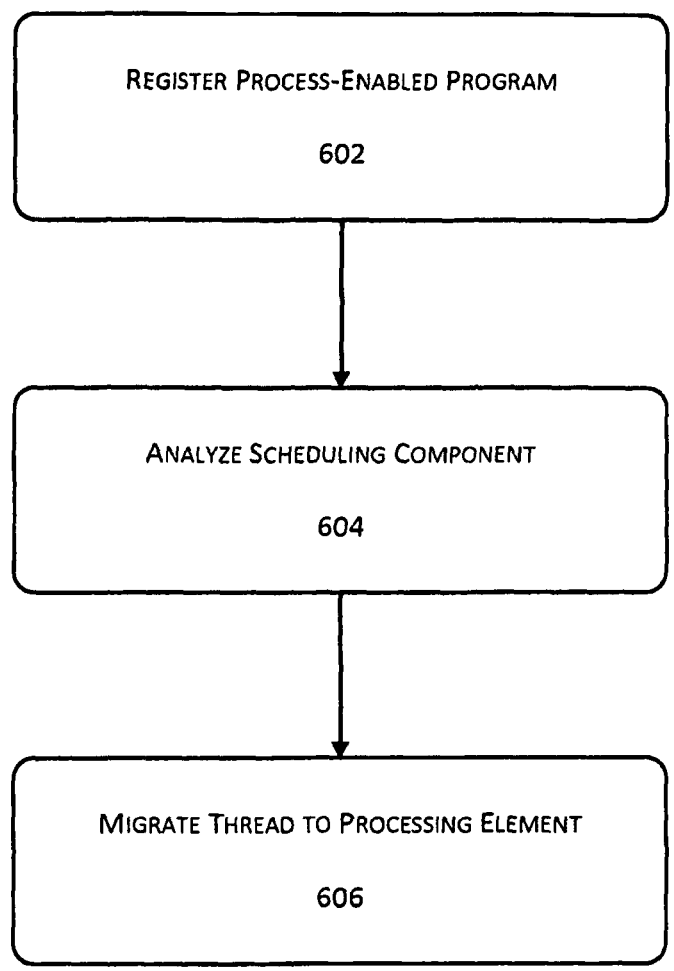
FIG. 6 shows an example configuration of a processing flow of operations for scheduling for multi-processor systems.

FIG. 6 shows an example configuration of a processing flow 600 of operations for scheduling for multi-processor systems, arranged in accordance with at least some embodiments described herein. As depicted, processing flow 600 includes sub-processes executable by various components (including one or more processors or other hardware element) that are part of computing environment 100. However, processing flow 600 is not limited to such components, and modification may be made by re-ordering two or more of the sub-processes described here, eliminating at least one of the sub-processes, adding further sub-processes, substituting components, having various components assuming sub-processing roles accorded to other components in the following description, and/or combinations thereof. Processing flow 600 may include various operations, functions, or actions as illustrated by one or more of blocks 602, 604, and/or 606. Processing may begin at block 602.

Block 602 (Register Process-Enabled Program) may refer to operating system 104 registering executable code 102, via system calls or other registration technique initiated by executable code 102. Executable code 102 may include computer program products, processor-enabled programs, applications, processes, or other computer-readable instructions that are executable by one or more processors, and may further include executable components 202 and scheduling components 204. Executable components 202 may be sub-sequences of executable code. 102, e.g., processes of applications or threads of processes. To establish communication with operating system 104, at least in some embodiments, executable code 102 may use a system call or other technique to register the location and organization of scheduling components 204 with operating system 104, a run-time environment, a device driver, a hyper-visor, and/or other element. In some embodiments, in which characteristics of executable components 202 may change and further cause scheduling components 204 to change a description of the minimal or adequate requirements and/or a preferred or adequate execution environment, executable code 102 may initiate a new system call or other communication to notify operating system 104, the run-time environment, the device driver, the hyper-visor, and/or other element. Processing may continue from block 602 to block 604.

Block 604 (Analyzing Scheduling Component) may refer to a compiler analyzing one of scheduling components 204 maintained by executable code 102, e.g., processor-enabled program. Scheduling components 204 may thus comprise information regarding minimal or adequate requirements such as minimal amounts of identified computing resources and/or preferred or adequate execution environment for executing the corresponding executable components 202. The minimal or adequate requirements and/or preferred or adequate execution environment may further include power requirements 302A, time constraints 302B, memory capacity requirements 302C, and/or other types of information 302N. Processing may continue from block 604 to block 606.

Block 606 (Migrate Thread to Processing Element) may refer to schedulers 402 migrating one of executable components 202, e.g., a thread, from one of processing elements 502 to another thereof as directed by the compiled one of scheduling components 204. In at least one example embodiment, the one of processing elements 502 may be a core. When executable code 102 updates information in scheduling components 204 during phase shifting, operating system 104 may then consult scheduling components 204, and schedulers 402 may accordingly opt to migrate the execution of executable components 202 between various ones of processing elements 502 of processing device 106 to thereby improve hardware utilization. Further, processing flow 600 may include a sub-process for executing the one of executable components 202, e.g., a thread, utilizing the one of processing elements 502, e.g., a core, directed by the compiled one of scheduling components 204.

Thus, FIG. 6 shows an example configuration of a processing flow 600 of operations for scheduling for multi-processor systems in accordance with various embodiments.

Figure 7:
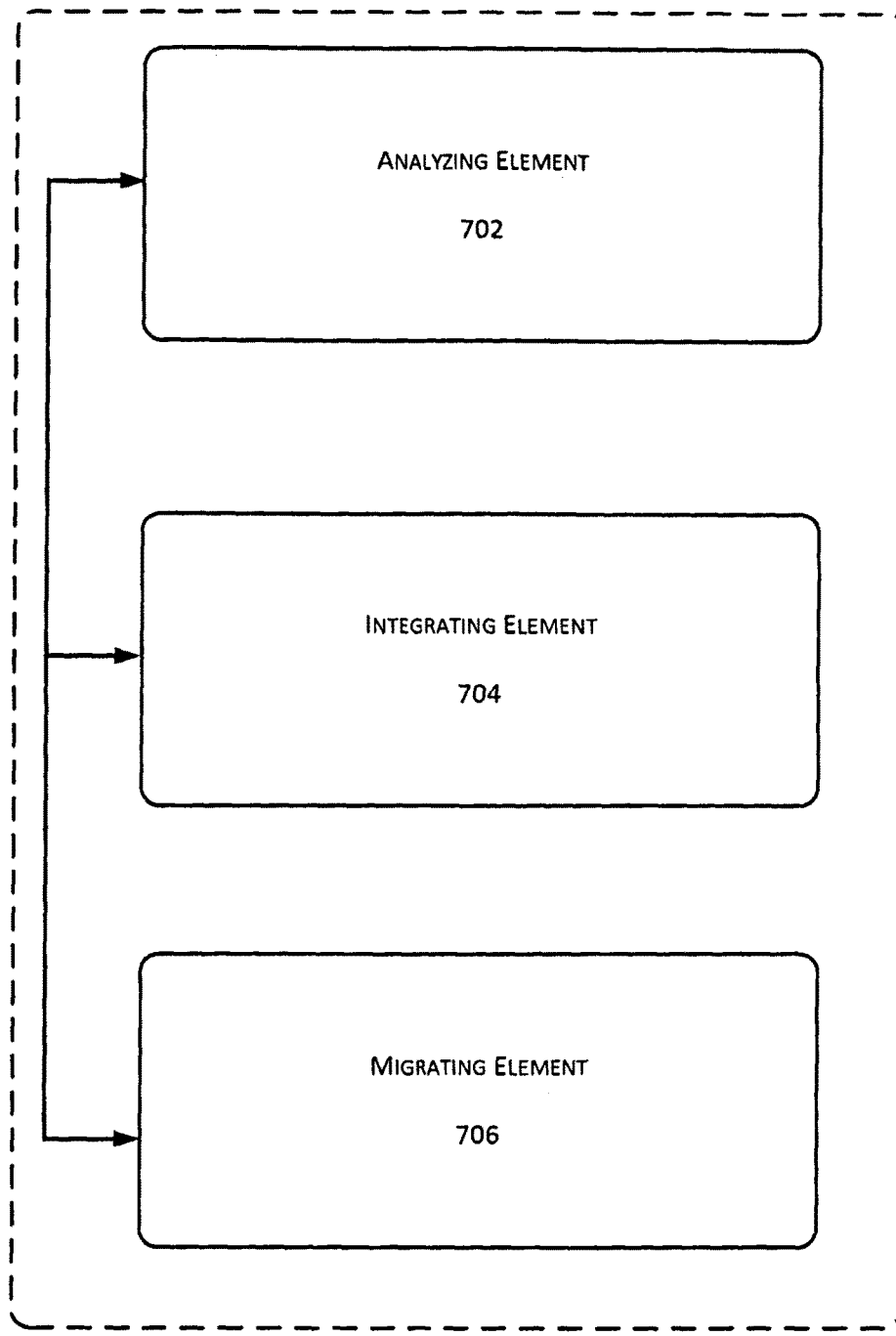
FIG. 7 shows an example configuration of an apparatus by which scheduling for multi-processor systems may be implemented.

FIG. 7 shows an example configuration of an apparatus 700, as an overall device that may include executable code 102, operating system 104, and processing device 106, by which scheduling for multi-processor systems may be implemented, arranged in accordance with at least some embodiments described herein. Apparatus 700 may be a processor, and therefore as depicted, apparatus 700 may include an analyzing element 702, an integrating element 704, and a migrating element 706, which may be operatively or communicatively coupled to each other, and at least some or portion of these elements may be implemented in hardware in various embodiments.

Analyzing element 702 may be a component that is configured to analyze executable instructions to identify scheduling components 204 that include at least a description of a particular processing element. In accordance with some examples, scheduling components 204 may store information regarding minimal or adequate requirements, including minimal amounts of identified types of computing resources and/or a preferred execution environment, regarding execution of corresponding ones of executable components 202. The executable instructions may be in the form of executable code 102 including applications, programs, functions, and/or other computer-readable instructions executable by one or more processors. The executable instructions may further comprise executable components 202, which may include processing threads.

Integrating element 704 may be a component that is configured to integrate metadata maintained by at least one of executable components 202 of executable code 102. In some embodiments, integrating element 704 may be one of an interpreter, converter, compiler, operating system, virtual machine, runtime environment, and/or other element. The integrated metadata may be embedded in each of scheduling components 204 and may include processing resource preferences for the at least one of executable components 202. The processing resource preferences may include a type of core, power requirements, time constraints, memory capacity requirements, and/or other parameters.

Migrating element 706 may be a component that is configured to migrate execution of the at least one of executable components 202 to one of processing elements 502 as directed by the integrated metadata. Processing elements 502 may be any of Central Processing Units, Graphics Processing Units, cores, cloud computing resources, other resource, and/or any combination thereof. In some example embodiments, the processing resource preferences may indicate that a certain type of core may improve the hardware utilization if the at least one of executable components 202 (e.g., threads) is executed by the type of core. Migrating element 706 may then migrate execution of the at least one of executable components to this type of core.

Thus, FIG. 7 shows an example configuration of an apparatus for implementing scheduling for multi-processor systems in accordance with various embodiments.

Figure 8:
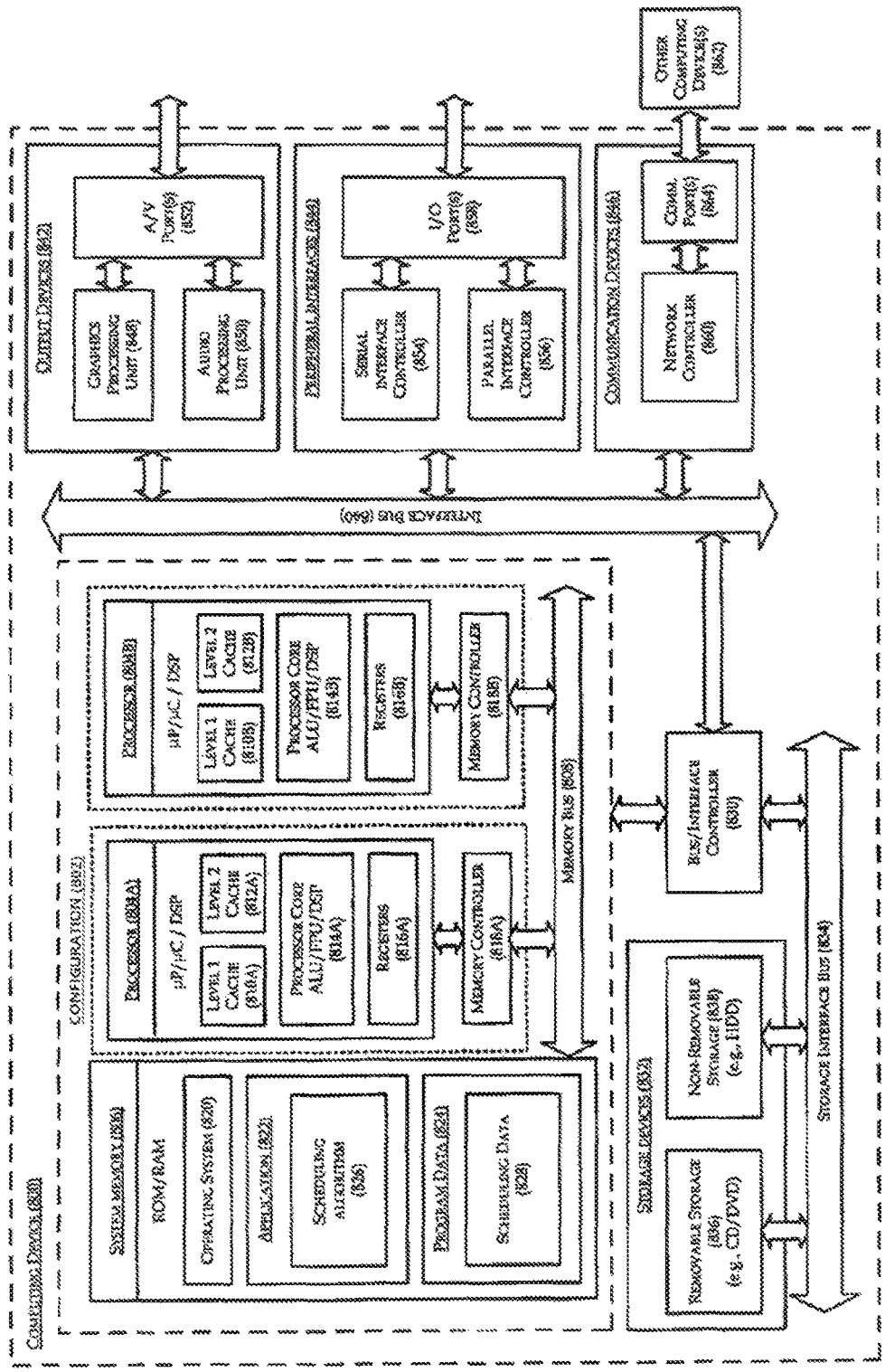
FIG. 8 shows a block diagram illustrating an example computing device by which various example solutions described herein may be implemented, all arranged in accordance with at least some embodiments described herein.

FIG. 8 is a block diagram illustrating an example computing device 800 that is arranged for scheduling computing tasks for multi-processor systems in accordance with the present disclosure. Example computing device 800 may include apparatus 700. In an example configuration 802, computing device 800 typically includes one or more processors 804, e.g., processor 804A and processor 804B, and a system memory 806. Processor 804A and processor 804B may be collectively referred as "processor 804" herein. A memory bus 808 may be used for communicating between processor 804 and system memory 806.

Depending on a particular configuration, processor 804 may be of any type including but not limited to a microprocessor (μP), a microcontroller (μC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on a particular configuration, system memory 806 may be of any type including but not limited to volatile memory (such as RAM), non-volatile memory (such as ROM, flash memory, etc.) or any combination thereof. System memory 806 may include an operating system 820 (which may embody operating system 104 previously described above), one or more applications 822, and program data 824. Operating system 820 may be configured to perform similar functions as operating system 104. Application 822 may include a scheduling algorithm 826 that is arranged to perform the functions as described herein including those described in FIG. 6. Program data 824 may include executable code 102 and multi-processor scheduling data 828 that may be useful for scheduling computing tasks for multi-processor system as is described herein. Scheduling data 828 may include schedule information 108 described in FIG. 1. In some embodiments, application 822 may be arranged to operate with program data 824 on operating system 820 such that implementations of scheduling computing tasks for multi-processor systems may be provided as described herein. This described configuration 802 is illustrated in FIG. 8 by those components within the inner dashed line.

Computing device 800 may have additional features or functionality, and additional interfaces to facilitate communications between configuration 802 and any particular devices and interfaces. For example, a bus/interface controller 830 may be used to facilitate communications between configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to configuration 802 via bus/interface controller 830. Example output devices 842 include a graphics processing unit 848 and an audio processing unit 850, which may be, configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The above description of illustrated embodiments, including what is described in the Abstract, is not intended to be exhaustive or to be limited to the precise forms disclosed. While specific embodiments and examples are described herein for illustrative purposes, various equivalent modifications are possible and can be made in light of the above detailed description. The terms used in the following claims should not be construed to be limited to the specific embodiments disclosed in the specification and the claims. Rather, the scope is to be determined entirely by the following claims, which are to be construed in accordance with established doctrines of claim interpretation.

We claim:

1. A non-transitory computer-readable medium having a data structure stored thereon that comprises:
executable code configured to provide information regarding allocation of resources to an operating system, the executable code comprising:

one or more executable components configured to execute a respective process;
one or more scheduling components, at least some of which respectively correspond to at least one of the executable components, wherein the one or more scheduling components provide information regarding at least a resource requirement to execute the one or more executable components in a current program phase and one or more upcoming program phases, wherein responsive to change of characteristics of the executable code, the one or more scheduling components:
update the information,
identify a particular type of processing element for a corresponding one of the executable components based on the updated information,
change at least a description of a processing resource preference to include the identified particular type of processing element,
provide the updated information and the changed description to the operating system, and
direct the operating system to migrate the corresponding one of the executable components to the particular type of processing element; and
a system call configured to register the one or more scheduling components with the operating system.

2. The computer-readable medium of claim 1, wherein the data structure includes an application or a program.

3. The computer-readable medium of claim 1, wherein the one or more scheduling components identify the particular type of processing element based on power demand in the current program phase and the one or more upcoming program phases for the respective one of the executable components.

4. The computer-readable medium of claim 1, wherein the one or more scheduling components identify the particular type of processing element based on time constraints in the current program phase and the one or more upcoming program phases for the respective one of the executable components.

5. The computer-readable medium of claim 1, wherein the particular type of processing element includes a core of a multicore processor.

6. The computer-readable medium of claim 1, wherein the particular type of processing element includes a core within a different architecture than a current architecture for a currently executed process.

7. The computer-readable medium of claim 1, wherein the one or more scheduling components are agnostic to a programming language of at least one of description of the particular type of processing element.

8. The computer-readable medium of claim 1, wherein the one or more scheduling components include keywords written in a programming language.

9. The computer-readable medium of claim 1, wherein the one or more scheduling components are configured to be analyzed by a compiler.

10. The computer-readable medium of claim 1, wherein the one or more scheduling components are configured as sampling based runtime code.

11. The computer-readable medium of claim 1, wherein the one or more scheduling components are configured to direct migration of the corresponding one of the executable components to the particular type of processing element thereof by listing one or more of minimal type of resources to execute the respective process or minimal amounts of the resources to execute the respective process.

12. The computer-readable medium of claim 11, wherein the resources include memory capacity.

13. The computer-readable medium of claim 1, wherein the system call is further configured to register the one or more scheduling components with a runtime environment.

14. The computer-readable medium of claim 1, wherein the system call is further configured to register the one or more scheduling components with a device driver.

15. A method, comprising:
registering, by an operating system, executable code configured to provide information regarding allocation of resources to the operating system, the executable code comprising one or more executable components configured to execute a respective process and the executable code further comprising one or more scheduling components, at least some of which respectively correspond to at least one of the executable components, wherein the registering includes registering, via a system call that is initiated by the executable code, the one or more scheduling components with the operating system;
analyzing, by the operating system, the one or more scheduling components, wherein the one or more scheduling components:
provide information regarding at least a resource requirement to execute the one or more executable components in a current application program phase and one or more upcoming application program phases,
update the information responsive to change of characteristics of the executable code,
identify a particular type of processing element for a corresponding one of the executable components based on the updated information, and
change at least a description of a processing resource preference to include the identified particular type of processing element to direct a migration of a thread to the particular type of processing element, and provide the updated information and the changed description to the operating system; and
migrating, by the operating system, the thread to the particular type of processing element as directed by the scheduling components.

16. The method of claim 15, further comprising executing the thread utilizing the particular type of processing element directed by the one or more scheduling components.

17. The method of claim 15, wherein the one or more scheduling components are written in a language other than a programming language.

18. The method of claim 15, wherein the migrating includes migrating the thread to the particular type of processing element based on one or both of power demand or time constraints for the thread.

19. An apparatus, comprising:
a non-transitory computer-readable medium having a data structure stored thereon that comprises:
executable code configured to provide information regarding allocation of resources to an operating system, the executable code comprising:
one or more executable components including executable instructions configured to execute a respective process,
one or more scheduling components, at least some of which respectively correspond to at least one of the executable components, and a system call configured to register the one or more scheduling components with the operating system; and at least one processor coupled to the computer-readable medium and comprising:

a first component, including a first hardware element, to analyze the executable instructions to identify metadata embedded in the one or more scheduling components, wherein the metadata includes at least a description of a processing resource preference including a particular type of processing element in a current program phase and one or more upcoming program phases, wherein the one or more scheduling components, in accordance with a change of characteristics of the executable instructions, identify an updated particular type of processing element, update the at least the description of the processing resource preference to include the updated particular type of processing element, and provide the metadata and the updated description to the operating system to direct the operating system to migrate execution of at least one thread of the executable instructions to the updated particular type of processing element;

a second component including a second hardware element, coupled to the first component, to register, via the system call, the one or more scheduling components and to integrate the metadata maintained by the at least one thread of the executable instructions; and a third component including a third hardware element, coupled to the second component, to migrate execution of the at least one thread to the updated particular type of processing element as directed by the one or more scheduling components.

20. The apparatus of claim 19, wherein the executable instructions include one of an application, a program, or a function.

21. The apparatus of claim 19, wherein the system call is further configured to register the one or more scheduling components with one of an interpreter, a converter, a compiler, a virtual machine, or runtime environment.

22. The apparatus of claim 19, wherein the integrated metadata includes processing resource parameters in the current program phase and the one or more upcoming program phases for the at least one thread.

23. The apparatus of claim 19, wherein the third component includes a driver to migrate execution.

* * * * *